United States Patent
Nakaura

(10) Patent No.: US 11,177,529 B2
(45) Date of Patent: Nov. 16, 2021

(54) BATTERY CONTAINER DEVICE, BATTERY DEVICE, AND METHOD OF REMOVING BATTERY

(71) Applicant: SHARP KABUSHIKI KAISHA, Sakai (JP)

(72) Inventor: Masaki Nakaura, Sakai (JP)

(73) Assignee: SHARP KABUSHIKI KAISHA, Sakai (JP)

( * ) Notice: Subject to any disclaimer, the term of this patent is extended or adjusted under 35 U.S.C. 154(b) by 119 days.

(21) Appl. No.: 16/791,145

(22) Filed: Feb. 14, 2020

(65) Prior Publication Data

US 2020/0266400 A1   Aug. 20, 2020

(30) Foreign Application Priority Data

Feb. 18, 2019   (JP) .............................. JP2019-026423

(51) Int. Cl.
| | | |
|---|---|---|
| *H01M 50/20* | (2021.01) | |
| *H01M 50/244* | (2021.01) | |
| *H01M 50/262* | (2021.01) | |
| *H01M 50/256* | (2021.01) | |

(52) U.S. Cl.
CPC ......... *H01M 50/20* (2021.01); *H01M 50/244* (2021.01); *H01M 50/256* (2021.01); *H01M 50/262* (2021.01); *H01M 2220/20* (2013.01)

(58) Field of Classification Search
USPC .................................................... 312/223.1
See application file for complete search history.

(56) References Cited

U.S. PATENT DOCUMENTS

| | | | | |
|---|---|---|---|---|
| 3,003,573 A | * | 10/1961 | Lorenz .................... | B60R 16/04 180/68.5 |
| 5,806,948 A | * | 9/1998 | Rowan, Sr. ............ | H05K 7/186 312/293.3 |
| 6,219,249 B1 | * | 4/2001 | Tuccio ................... | H05K 7/183 312/223.2 |
| 2012/0328926 A1 | * | 12/2012 | Tai ........................ | H01M 50/20 429/100 |
| 2018/0290679 A1 | * | 10/2018 | Arai ..................... | H01M 50/256 |

FOREIGN PATENT DOCUMENTS

| | | | | | |
|---|---|---|---|---|---|
| EP | 3196063 B1 | * | 7/2019 | ............... | B60K 1/04 |
| JP | 09048297 A | * | 2/1997 | | |
| JP | 2013-058043 A | | 3/2013 | | |

* cited by examiner

*Primary Examiner* — Gregg Cantelmo
(74) *Attorney, Agent, or Firm* — ScienBiziP, P.C.

(57) ABSTRACT

A battery container device includes a battery container that removably contains a battery that supplies power to a driver, and a stopper member provided at a removal port for the battery in the battery container. In the battery container device, the stopper member includes an opening part that allows a first wheel provided on the removal port side in the battery to pass through the removal port during removal of the battery from the battery container, and a restrictor that restricts a second wheel provided on a side opposite to the removal port in the battery from passing through the removal port during removal of the battery from the battery container.

9 Claims, 12 Drawing Sheets

BATTERY CONTAINER DEVICE, BATTERY DEVICE, AND METHOD OF REMOVING BATTERY

INCORPORATION BY REFERENCE

This application is based upon and claims the benefit of priority from the corresponding Japanese Patent Application No. 2019-026423 filed on Feb. 18, 2019, the entire contents of which are incorporated herein by reference.

BACKGROUND OF THE INVENTION

Field of the Invention

The present disclosure relates to a battery container device, a battery device, and a method of removing a battery.

Description of the Background Art

Various types of mobile robots are known as traveling devices, such as a cleaning robot that cleans a room, a transport robot that transports a cargo, and a guide robot that guides inside a facility. For example, a mobile robot controls traveling (movement) of the device main body by driving a driving motor with electric power supplied from an internally installed battery so that its own wheels are rotationally driven.

In such a traveling device, if the performance of the battery decreases, the battery needs to be replaced. In general, the battery internally installed in the traveling device is heavy, which makes it not easy to replace.

SUMMARY OF THE INVENTION

An object of the present disclosure is to provide a battery container device, a battery device, and a method of removing a battery, which are capable of making the work of battery replacement easier.

A battery container device according to an aspect of the present disclosure includes a battery container that removably contains a battery that supplies power to a driver, and a stopper member provided at a removal port for the battery in the battery container. In the battery container device, the stopper member includes an opening part that allows a first wheel provided on the removal port side in the battery to pass through the removal port during removal of the battery from the battery container, and a restrictor that restricts a second wheel provided on a side opposite to the removal port in the battery from passing through the removal port during removal of the battery from the battery container.

A battery device according to another aspect of the present disclosure includes the battery container device and the battery, and in the battery, the first wheel and the second wheel are offset from each other if the battery is viewed from a removal direction in which the battery is removed.

A method of removing a battery according to still another aspect of the present disclosure is of removing the battery from the battery container in the battery device. The method includes pulling the battery contained in the battery container toward the removal port side to pass the first wheel through the opening part of the stopper member, bringing the second wheel into contact with the restrictor of the stopper member after the first wheel passes through the opening part, bringing the first wheel into contact with a floor surface in a state where the second wheel is in contact with the restrictor, and in a state in which the first wheel is in contact with the floor surface, causing the second wheel to run over the restrictor and bringing the second wheel into contact with the floor surface.

According to the present disclosure, it is possible to provide a battery container device, a battery device, and a method of removing a battery, which are capable of making the work of replacement of battery easier.

This Summary is provided to introduce a selection of concepts in a simplified form that are further described below in the Detailed Description with reference where appropriate to the accompanying drawings. This Summary is not intended to identify key features or essential features of the claimed subject matter, nor is it intended to be used to limit the scope of the claimed subject matter. Furthermore, the claimed subject matter is not limited to implementations that solve any or all disadvantages noted in any part of this disclosure.

DESCRIPTION OF THE PREFERRED EMBODIMENTS

Below, an embodiment of the present disclosure will be described with reference to the attached drawings. It is noted that the following embodiment is an example in which the present disclosure is embodied, and does not intend to limit the technical scope of the present disclosure.

In the present embodiment, a description will be given of a battery for supplying power to a device main body (driver) of an autonomous mobile robot, and a battery container device that contains the battery. The battery is internally installed in the device main body of the autonomous mobile robot to supply power to the device main body. The battery is removably and internally installed in the device main body.

Configuration of Autonomous Mobile Robot 100

Figure 1:
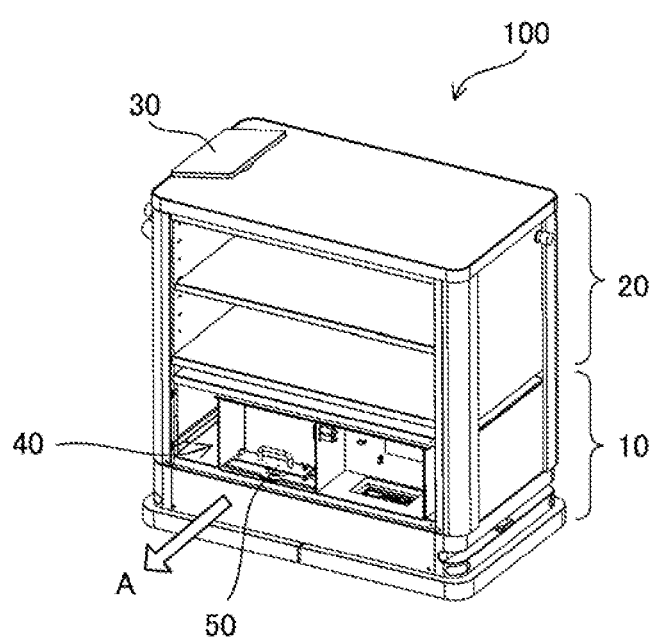
FIG. 1 is a perspective view illustrating an overall configuration of an autonomous mobile robot according to an embodiment of the present disclosure.

FIG. 1 is a perspective view illustrating an overall configuration of an autonomous mobile robot 100 according to an embodiment of the present disclosure. The autonomous mobile robot 100 includes a travel driver 10, a storage 20, an operation display 30, a controller (not illustrated), a data storage (not illustrated), and the like.

The autonomous mobile robot 100 is, for example, an automatic guided vehicle capable of unmanned travel. The autonomous mobile robot 100 may have a function of managing a location, quantity, weight, and the like of articles to be handled, or performing operation management. The function may be provided in a management device (not illustrated) that manages the autonomous mobile robot 100 or an operation terminal (not illustrated) that can remotely control the autonomous mobile robot 100.

The travel driver 10 includes two drive wheels (not illustrated) disposed on the left and right sides of the bottom of the main body of the autonomous mobile robot 100, driven wheels (not illustrated) rotatably mounted on the bottom of the main body, and a battery 50 for supplying power to the main body of the autonomous mobile robot 100. The travel driver 10 is an example of a driver according to the present disclosure. The battery 50 is an example of a battery according to the present disclosure. It is noted that the battery 50 does not need to be contained in the travel driver 10, and is contained anywhere inside the main body of the autonomous mobile robot 100.

The storage 20 is a storage rack on which a cargo is placed, and is installed on the upper surface of the travel driver 10. The autonomous mobile robot 100 may include a carriage on the upper surface of the travel driver 10 instead of the storage 20. The autonomous mobile robot 100 may also include only the travel driver 10. In this case, the autonomous mobile robot 100 can be used as a towing vehicle for towing a carriage or the like.

The operation display 30 includes a touch panel including an operation processor that operates the autonomous mobile robot 100 and a display that displays various types of setting screens and the like. The operation display 30 receives various types of operations from the operator. For example, the operation display 30 receives an operation for starting automatic travel, an operation for specifying a traveling speed and a traveling direction to cause the autonomous mobile robot 100 to manually travel, an operation for instructing to charge the battery 50, an operation for setting (reserving, revising, or the like) a travel route, and the like. Further, the operation display 30 displays various types of screens including an operation screen for receiving the operation, a travel display screen for displaying a travel state of the autonomous mobile robot 100, and a setting screen for setting the travel route, or the like.

The data storage is a non-volatile storage including a semiconductor memory, a hard disk drive (HDD), a solid state drive (SSD), or the like that store various types of information. For example, the data storage stores a control program such as a program for causing the controller to execute a traveling process.

Further, picking information is stored in the data storage. In the picking information, in which location in which storage shelf each of the articles to be transported is placed is indicated, and also how many of which articles, from among those articles, to be transported to which location is indicated. Further, the data storage stores article information. The article information indicates the quantity of each of the articles stored in the storage shelf, the weight, the volume, and the like thereof.

Further, information necessary for the autonomous mobile robot 100 to travel is stored in the data storage. For example, route information indicating a travel route on which the autonomous mobile robot 100 travels is stored in the data storage. The travel route corresponds to, for example, a route on which a magnetic tape is applied on a floor surface on which the autonomous mobile robot 100 travels, or a route set (reserved) by the operator.

The control program is recorded non-temporarily on a computer-readable recording medium such as a universal serial bus (USB) flash drive, a certificate of deposit (CD), or a digital versatile disc (DVD). The control program is read by a reading device (not illustrated) such as a USB drive, a CD drive, or a DVD drive provided in the autonomous mobile robot 100, and stored in the data storage. Further, the control program may be downloaded from an external device via a communication network and stored in the data storage.

The controller includes a control device for a central processing unit (CPU), a Read-Only Memory (ROM), a random-access memory (RAM), and the like. The CPU is a processor that executes various types of arithmetic processes. The ROM is a non-volatile storage in which a control program such as basic input-output system (BIOS) and operating system (OS) for causing the CPU to execute various types of arithmetic processes is stored in advance. The RAM is a volatile or non-volatile storage that stores various types of information, and is used as a temporary storage memory (working area) for various types of processes executed by the CPU. The controller controls the autonomous mobile robot 100 by causing the CPU to execute the various types of control programs stored in advance in the ROM or the data storage.

Specifically, the controller acquires operation information corresponding to an operation of the operator on the operation display 30. Further, the controller switches a travel mode of the autonomous mobile robot 100, based on the operation information. Specifically, if the operator performs, on the operation display 30, an operation for starting automatic travel, the controller sets the travel mode of the autonomous mobile robot 100 to an automatic travel mode. Further, if the operator performs, on the operation display 30, an operation for ending automatic travel or an operation for starting manual travel, the controller sets the travel mode of the autonomous mobile robot 100 to a manual travel mode.

Further, the controller controls a travel operation of the autonomous mobile robot 100 based on the travel mode. For example, if the travel mode is set to the automatic travel mode, the controller causes the autonomous mobile robot 100 to travel according to a travel route corresponding to the route information stored in the data storage. Specifically, the controller transmits, to the travel driver 10, a travel instruction corresponding to the travel route.

Further, if the travel mode is set to the manual travel mode, the controller causes the autonomous mobile robot 100 to travel based on an operation of the operator on the operation display 30 or the operation terminal (not illustrated). For example, the controller transmits, to the travel driver 10, a travel instruction according to the operation of the operator on the operation terminal.

Further, the controller notifies the operation display 30 and the like of information indicating a current state such as the travel state of the autonomous mobile robot 100. For example, the controller displays, on the operation display 30, information indicating a current travel plan and travel position (current travel position) of the autonomous mobile robot 100.

Further, the controller monitors the charge level of the battery 50. If the charge level falls below a threshold, the controller causes the operation display 30 to display a message for prompting charging or the like. Further, if the performance of the battery 50 is deteriorated and the battery 50 needs to be replaced with a new one, the controller causes the operation display 30 to display, for example, a message (replacement message) for prompting the replacement of the battery 50. The battery 50 supplies power to the respective modules, such as the travel driver 10, the operation display 30, the controller, and the data storage.

If the message for replacing the battery 50 is displayed on the operation display 30, the operator turns off the power of the autonomous mobile robot 100, and then performs the work of replacement of the battery 50. In general, a battery internally installed an autonomous mobile robot is heavy, which makes it not easy to replace. In contrast, in the autonomous mobile robot 100 according to the present embodiment, it is possible to make the work of replacement of the battery 50 easier.

As illustrated in FIG. 1, the battery 50 is removably contained in a battery container 40 of the travel driver 10. The battery container 40 is an example of a battery container of the present disclosure. FIG. 1 illustrates a state where the battery 50 is exposed from the travel driver 10, while the travel driver 10 is provided with a cover (not illustrated) for covering the battery container 40. Thus, the battery 50 is in a state of being internally installed in the travel driver 10.

Figure 2:
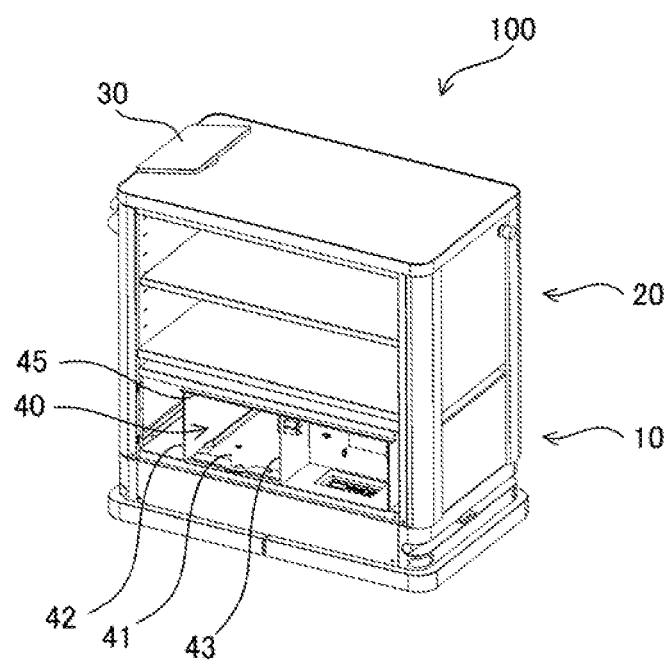
FIG. 2 is a perspective view illustrating a configuration of the autonomous mobile robot according to the embodiment of the present disclosure with a battery removed.

As illustrated in FIG. 2, the battery container 40 includes a bottom plate 41, side plates 42 and 43 rising upward from the bottom plate 41, and an upper plate 45 connecting the upper ends of the side plates 42 and 43. The battery container 40 has a removal port 40a that is open. Through the removal port 40a, the battery 50 is removably placed in the battery container 40. For example, the battery 50 is removed from the battery container 40 by being pulled out in the direction A illustrated in FIG. 1. Hereinafter, the direction A is also referred to as a removal direction.

Figure 3A:
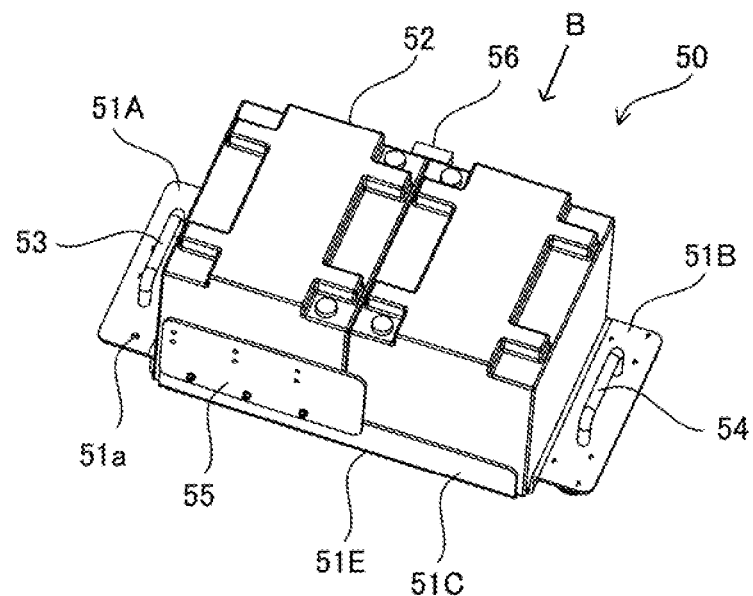
FIG. 3A is a perspective view illustrating a configuration of a battery internally installed in the autonomous mobile robot according to the embodiment of the present disclosure.
Figure 3B:
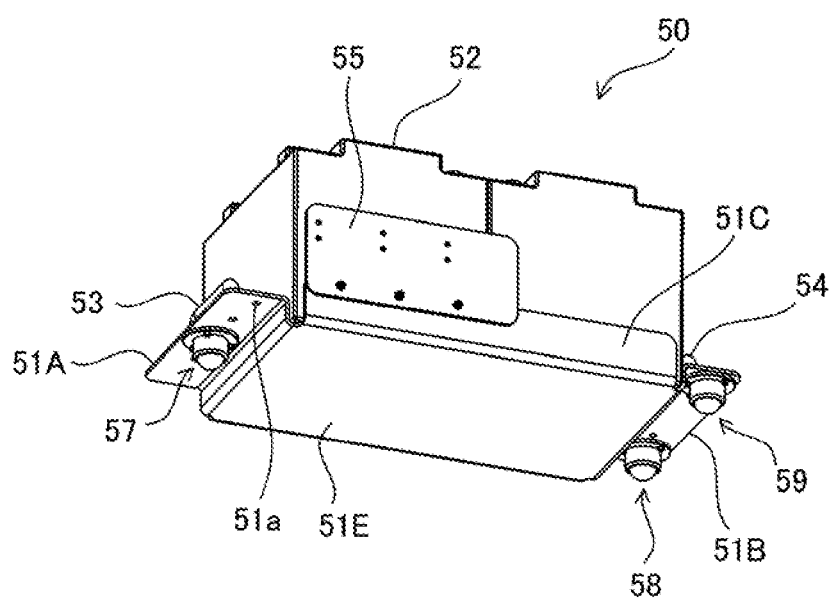
FIG. 3B is another perspective view illustrating the configuration of the battery internally installed in the autonomous mobile robot according to the embodiment of the present disclosure.
Figure 3C:
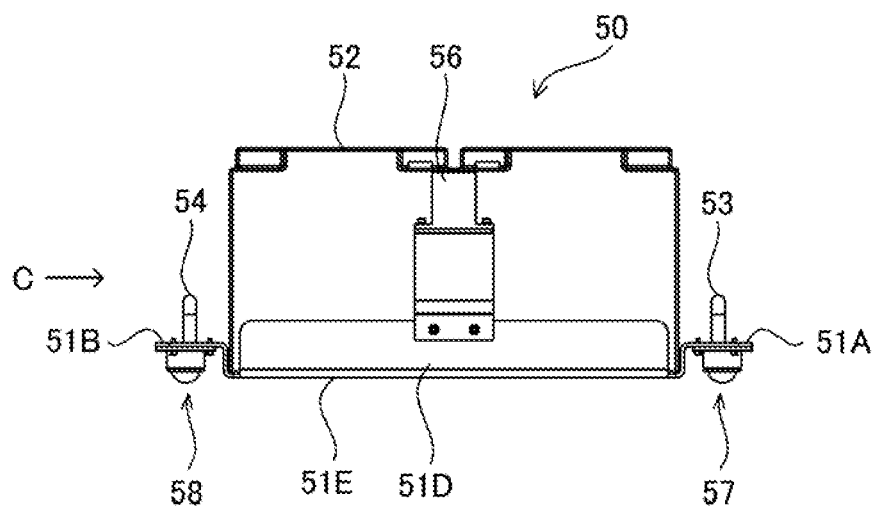
FIG. 3C is a side view illustrating the configuration of the battery internally installed in the autonomous mobile robot according to the embodiment of the present disclosure.
Figure 3D:
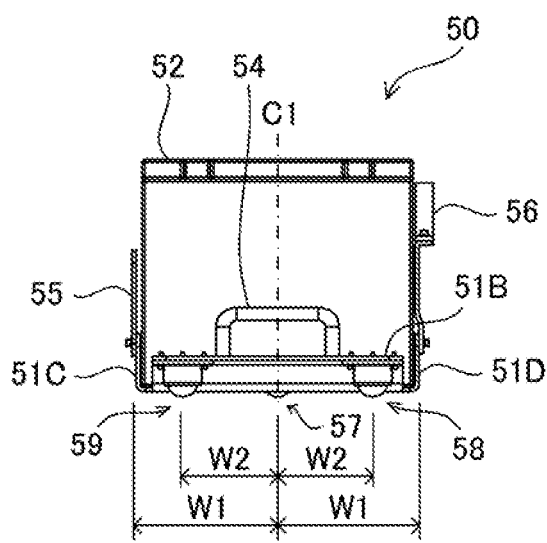
FIG. 3D is a rear view illustrating the configuration of the battery internally installed in the autonomous mobile robot according to the embodiment of the present disclosure.

FIGS. 3A to 3D illustrate a configuration of the battery 50. FIG. 3A is a perspective view of the battery 50 as viewed obliquely from above. FIG. 3B is a perspective view of the battery 50 as viewed obliquely from below. FIG. 3C is a side view of the battery 50 as viewed from the direction B of FIG. 3A. FIG. 3D is a rear view of the battery 50 as viewed from the direction C of FIG. 3C.

The battery 50 includes a battery main body 52 and a supporter 51 that supports the battery main body 52.

The supporter 51 includes a bottom plate 51E, side plates 51C and 51D that rise upward from the bottom plate 51E, a front plate 51A that rises upward from the bottom plate 51E and extends toward the removal port 40a (in the removal direction), and a rear plate 51B that rises upward from the bottom plate 51E and extends toward the opposite side to the removal port 40a (rearward). The front plate 51A is provided with a front grip 53. The rear plate 51B is provided with a rear grip 54. The front grip 53 is an example of a first grip of the present disclosure. The rear grip 54 is an example of a second grip of the present disclosure. Further, the side plate 51C is provided with a metal fitting 55 that protrudes upward. A harness (not illustrated) for the battery 50 is fixed to the fitting 55. Further, a fuse 56 (see FIG. 3C) is fixed to the side plate 51D via a metal fitting that protrudes upward.

A wheel 57 is rotatably provided on the lower surface of the front plate 51A. The wheel 57 is provided on the removal port 40a side (front side). The wheel 57 is disposed at the center in the width direction of the battery 50 (see FIG. 3D). In FIG. 3D, a center line C1 in the width direction of the battery 50, and widths W1 from the center line C1 to the side plates 51C and 51D are illustrated. The lower end of the wheel 57 protrudes downward from the lower end of the bottom plate 51E. The wheel 57 is an example of a first wheel of the present disclosure.

Wheels 58 and 59 are rotatably provided on the lower surface of the rear plate 51B. The wheels 58 and 59 are provided on the opposite side to the removal port 40a (rear side). Further, the wheel 58 is disposed on the side plate 51C side by the width W2 from the center line C1, and the wheel 59 is disposed on the side plate 51D side by the width W2 from the center line C1 (see FIG. 3D). The lower ends of the wheels 58 and 59, like the wheel 57, protrude downward from the lower end of the bottom plate 51E. The wheels 58 and 59 are each an example of a second wheel of the present disclosure.

As illustrated in FIG. 3D, the wheel 57 and the wheels 58 and 59 are offset from each other if the battery 50 is viewed from the removal direction. Further, in the battery 50, the wheel 57 is provided at one place on the removal port 40a side, and the wheels 58 and 59 are provided at two places on the side opposite to the removal port 40a.

In a state where the battery 50 is placed on the floor surface, the wheels 57, 58, and 59 come into contact with the floor surface so that the battery 50 can be free-standing and moved. In this state, for example, if the operator presses the battery 50 with his/her hand, the wheels 57, 58, and 59 rotate so that the battery 50 moves on the floor surface. Further, the operator can hold the front grip 53 and the rear grip 54 to place or remove the battery 50 in or from the battery container 40.

Figure 4:
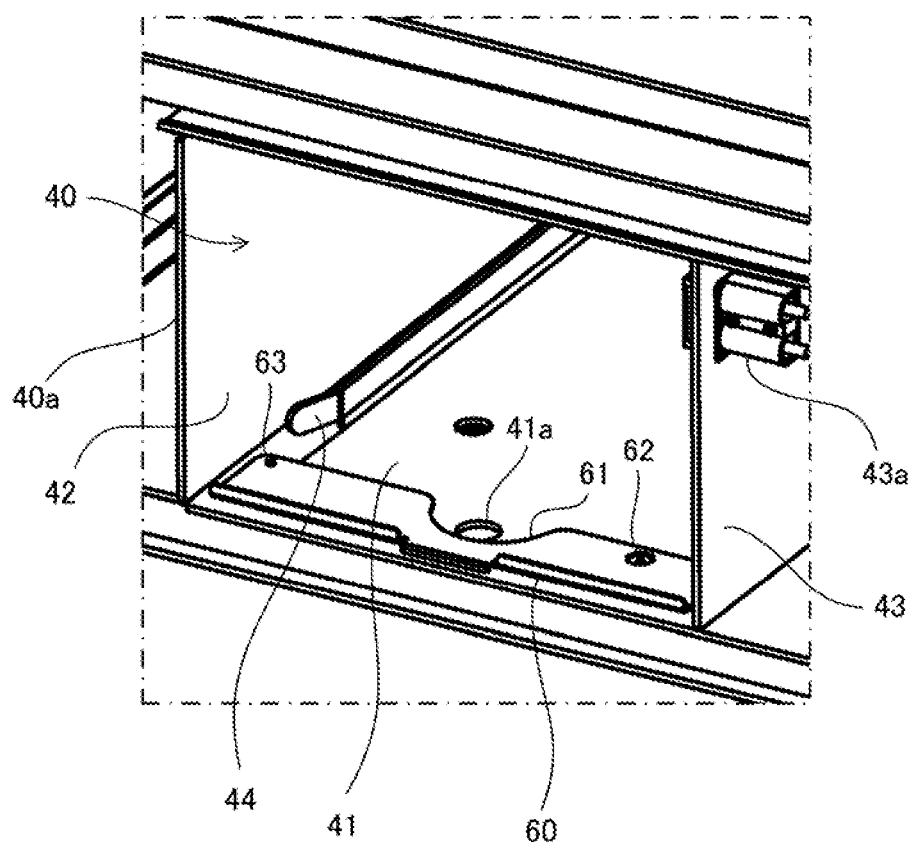
FIG. 4 is a perspective view illustrating a configuration of a battery container with the battery removed in the autonomous mobile robot according to the embodiment of the present disclosure.

FIG. 4 is a perspective view illustrating a configuration of the battery container 40. As illustrated in FIG. 4, a receiver 41a is formed on the bottom plate 41. The receiver 41a is an example of a receiver of the present disclosure. The shape of the receiver 41a is not limited to a circle. Further, a stopper member 60 is provided in the battery container 40. The stopper member 60 is fixed to the bottom plate 41 by screws passing through screw holes 63 formed on the left and right in the removal port 40a of the battery container 40. Further, a cutout part 61 is formed in the stopper member 60 so that the receiver 41a is exposed. Further, a stopper hole 62 is formed in the stopper member 60. The stopper member 60 is an example of a stopper member according to the present disclosure. Further, the removal port 40a is an example of a removal port according to the present disclosure.

Further, the battery container 40 and the stopper member 60 are an example of a battery container device of the present disclosure. Further, the battery 50, the battery container 40, and the stopper member 60 are an example of a battery device according to the present disclosure. That is, the battery container device according to the present disclosure includes, for example, the battery container 40 and the stopper member 60, and the battery device according to the present disclosure includes, for example, the battery 50, the battery container 40, and the stopper member 60.

Further, a guide member 44 is provided in the battery container 40. An end of the guide member 44 on the removal port 40a side is bent outward.

Figure 5:
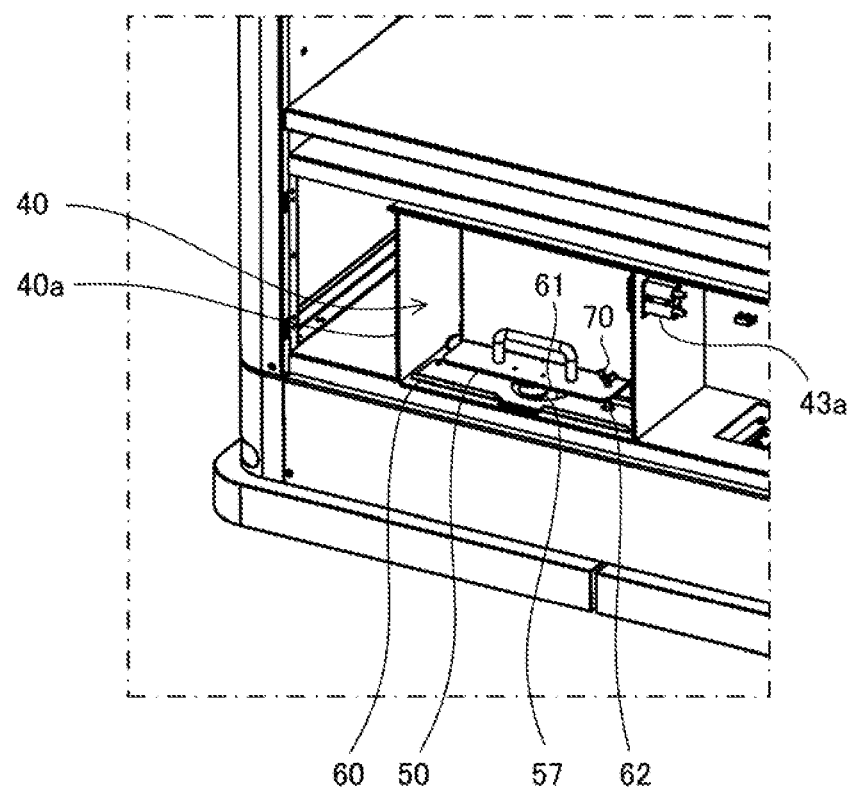
FIG. 5 is a perspective view illustrating a configuration of a battery container with a battery installed, in the autonomous mobile robot according to the embodiment of the present disclosure.

FIG. 5 illustrates a state where the battery 50 is contained in the battery container 40. The battery 50 is placed by being pushed along the guide member 44 toward the far side of the battery container 40.

As illustrated in FIG. 5, once the battery 50 has been placed in the battery container 40, the wheel 57 disposed on the removal port 40a side is received by the receiver 41a (see FIG. 4). It is noted that the size (opening width) of the receiver 41a is set to be smaller than the outer diameter of the wheel 57. Accordingly, a lower portion of the wheel 57 is received by the receiver 41a. Further, the wheel 57 is received in the cutout part 61 of the stopper member 60. It is noted that, in a state where the wheel 57 is received by the receiver 41a, the wheel 57 is not in contact with the stopper member 60.

Once the wheel 57 is received by the receiver 41a, the movement of the battery 50 in the removal direction is restricted. It is noted that, in order to securely fix the battery 50 to the device main body, a pin 70 is passed through a pin hole 51a (see FIG. 3A) formed in the front plate 51A of the supporter 51 and inserted into the stopper hole 62 (see FIG. 4). Further, a harness for the battery 50 is connected to a terminal 43a (FIG. 5). This makes it possible to supply the electric power of the battery 50 to the device main body to cause the autonomous mobile robot 100 to travel.

Figure 6:
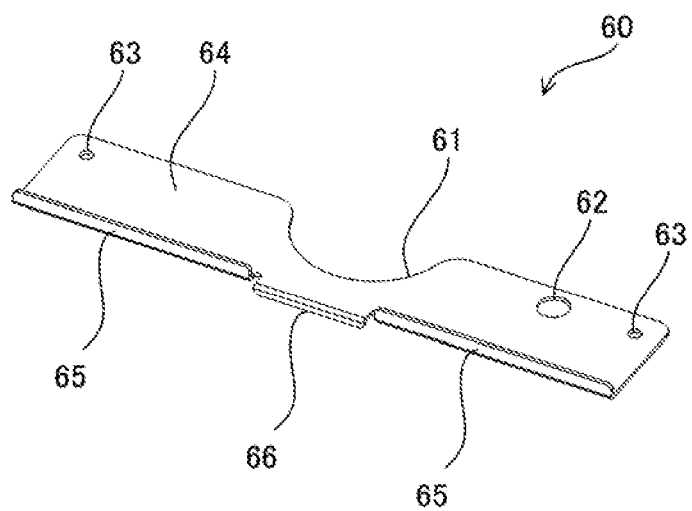
FIG. 6 is a perspective view illustrating a configuration of a stopper member in the autonomous mobile robot according to the embodiment of the present disclosure.
Figure 7:
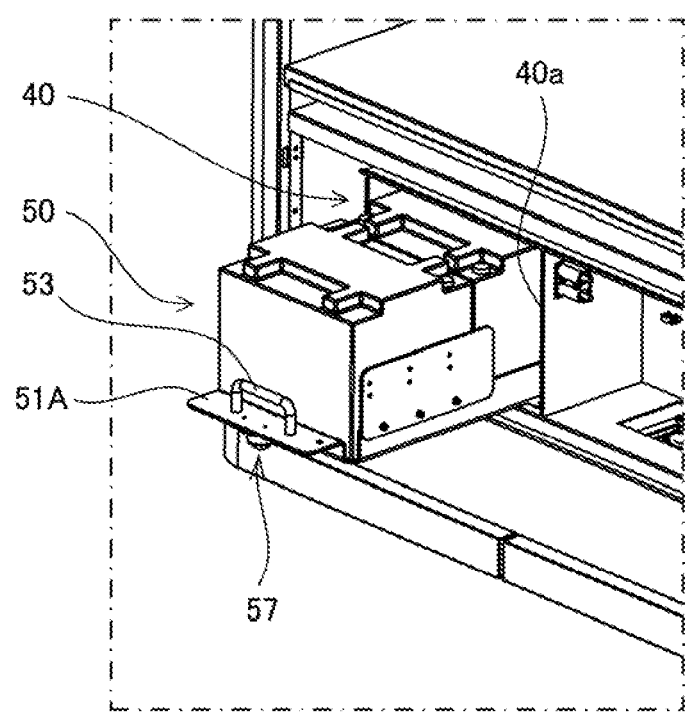
FIG. 7 is a diagram for explaining a method of removing a battery in the autonomous mobile robot according to the embodiment of the present disclosure.
Figure 8:
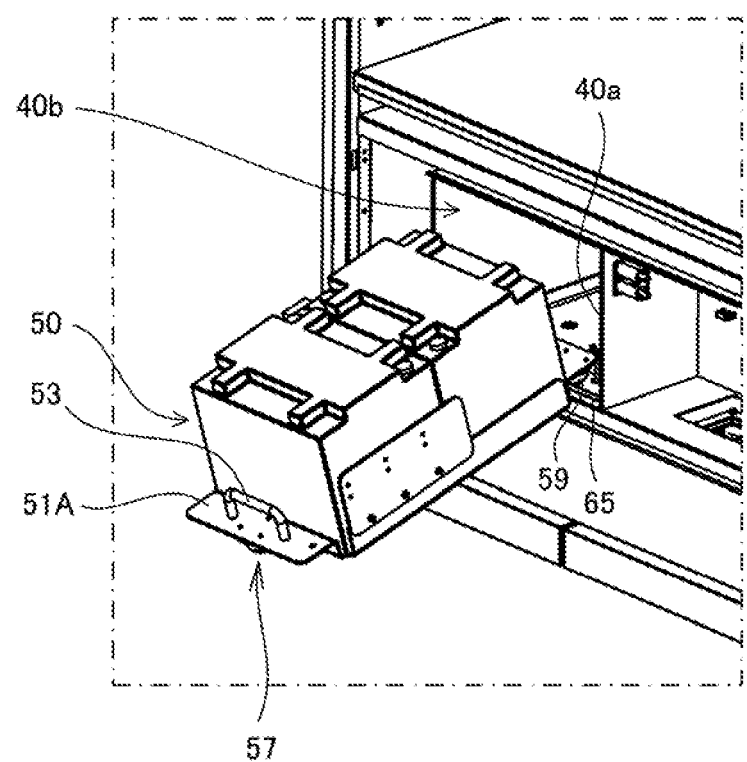
FIG. 8 is a diagram for explaining the method of removing the battery in the autonomous mobile robot according to the embodiment of the present disclosure.

FIG. 6 is a perspective view illustrating a configuration of the stopper member 60. As illustrated in FIG. 6, the stopper member 60 includes a bottom plate 64, restrictors 65 that rise upward from the bottom plate 64, and an opening part 66 on the same plane as the bottom plate 64. The cutout part 61, the stopper hole 62, and the screw holes 63 are formed in the bottom plate 64. The stopper member 60 is fixed to the bottom plate 41 by screws passing through the screw holes 63 in the removal port 40a of the battery container 40 (see FIG. 4).

The opening part 66 allows the wheel 57 to pass through the removal port 40a during removal of the battery 50 from the battery container 40. The opening part 66 is provided so as to overlap with a traveling path of the wheel 57 during removal of the battery 50 from the battery container 40. As a result, for example, in a state where the battery 50 is contained in the battery container 40, to pull out the battery 50 toward the near side, the operator can grasp the front grip 53 and pull the battery 50 toward the near side so that the wheel 57 passes through the opening part 66.

The restrictors 65 restrict the wheels 58 and 59 from passing through the removal port 40a during removal of the battery 50 from the battery container 40. The restrictors 65 are provided so as to overlap with traveling paths of the wheels 58 and 59 during removal of the battery 50 from the battery container 40. As a result, if the operator pulls the battery 50 to the near side, the wheel 57 passes through the opening part 66, and then the wheels 58 and 59 come into contact with the restrictors 65, and thus the movement is restricted (stopped). When the wheels 58 and 59 run over the restrictors 65, the battery 50 has been removed from the battery container 40.

Here, the distance from the front wheel 57 to the rear wheels 58 and 59 (the distance between the wheel centers) is longer than the distance (height) from the floor surface to the upper surface of the stopper member 60. That is, the battery 50 is configured such that the wheel 57 can come into contact with the floor surface when the wheels 58 and 59 come into contact with the restrictors 65 during removal of the battery 50 from the battery container 40.

Method of Removing Battery 50

A procedure of a method of removing the battery 50 will be described with reference to FIGS. 7 to 10 by way of example. The method is an example of a method of removing a battery according to the present disclosure. First, the operator removes a cover (not illustrated) for covering the battery container 40, and pulls the battery 50 to the near side with grasping the front grip 53 of the battery 50. As a result, the wheel 57 is disengaged from the receiver 41a (see FIG. 5), and rides on the bottom plate 64 (see FIG. 6) of the stopper member 60. As a result, the wheels 57 to 59 rotate in the battery container 40 so that the battery 50 starts to move toward the removal port 40a.

As the operator continuously pulls the front grip 53 toward the near side, the battery 50 moves to the removal port 40a side, and the wheel passes through the opening part 66 of the stopper member 60 (see FIG. 6). Once the wheel 57 has passed through the opening part 66 and exited from the battery container 40, the front part of the battery 50 is supported by the operator in a floating state (see FIG. 7).

As the operator continuously pulls the battery 50 toward the near side with grasping the front grip 53, the rear wheels 58 and 59 rotate so that the battery 50 moves toward the removal port 40a. Thereafter, the wheels 58 and 59 come into contact with the restrictors 65, and the movement of the battery 50 is restricted (stopped) (see FIG. 8).

Figure 9:
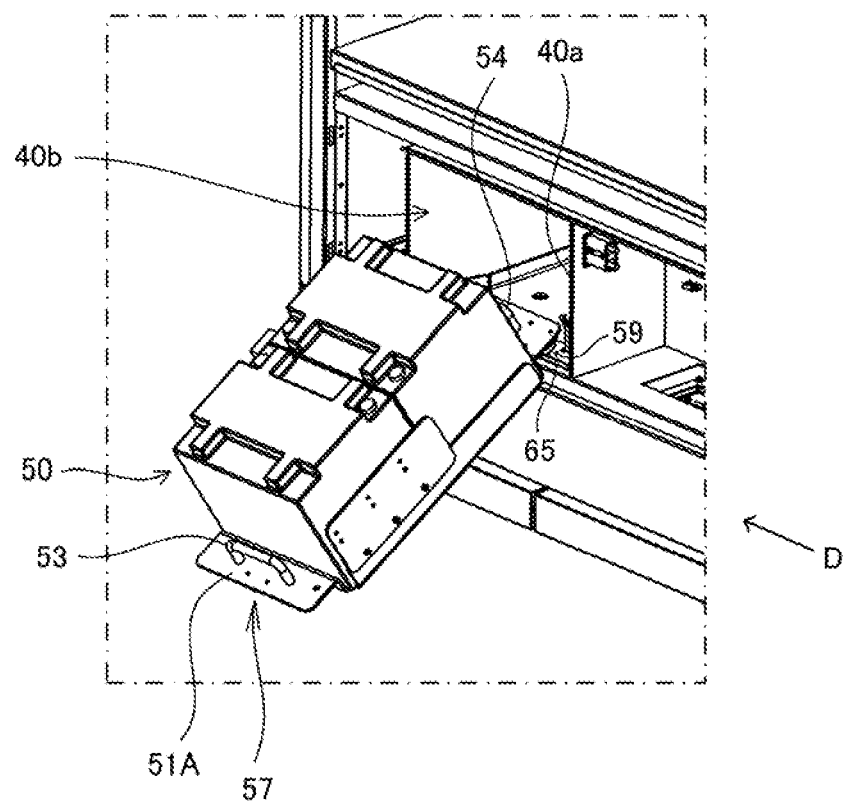
FIG. 9 is a diagram for explaining the method of removing the battery in the autonomous mobile robot according to the embodiment of the present disclosure.
Figure 10:
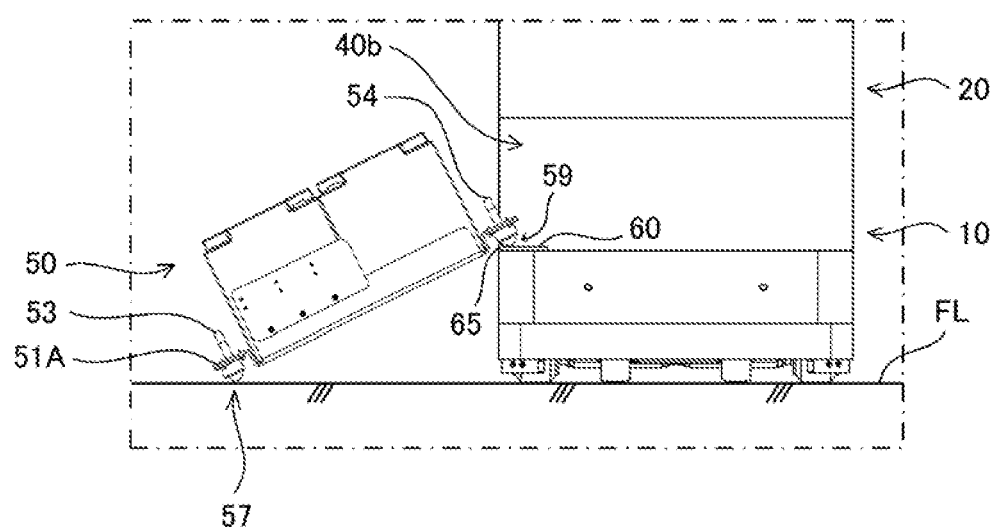
FIG. 10 is a diagram for explaining the method of removing the battery in the autonomous mobile robot according to the embodiment of the present disclosure.

Next, the operator tilts the front part of the battery 50 of which the front grip 53 is grasped downward to bring the front wheel 57 into contact with a floor surface FL (see FIGS. 9 and 10). It is noted that FIG. 10 is a side view as viewed from the direction D of FIG. 9. As a result, the battery 50 is supported by the wheel 57 in contact with the floor surface FL and the wheels 58 and 59 in contact with the restrictors 65. At this time, as illustrated in FIGS. 9 and 10, a space (an upper space) between the battery 50 and the battery container 40 is formed as a space 40b (work space) for the operator to grasp the rear grip 54.

Next, the operator lifts the rear part of the battery 50 with grasping the rear grip 54 in the space 40b so that the wheels 58 and 59 run over the restrictors 65. Thereafter, while grasping the rear grip 54, the operator tilts the rear part of the battery 50 downward to bring the wheels 58 and 59 into contact with the floor surface FL. As a result, the battery 50 has been removed from the battery container 40, so that the operator can move the battery 50 on the floor surface FL.

Thereafter, when mounting a new battery 50 on the autonomous mobile robot 100, the operator can place the battery 50 in the battery container 40 by performing the work in the reverse order of the above-described procedure.

As described above, the method of removing a battery includes pulling the battery 50 contained in the battery container 40 toward the removal port 40a side to pass the wheel 57 through the opening part 66 of the stopper member 60, bringing the wheels 58 and 59 into contact with the restrictors 65 of the stopper member 60 after the wheel 57 passes through the opening part 66, bringing the wheel 57 into contact with the floor surface FL in a state where the wheels 58 and 59 are in contact with the restrictors 65, and in a state in which the wheel 57 is in contact with the floor surface FL, causing the wheels 58 and 59 to run over the restrictor 65 and bringing the wheels 58 and 59 into contact with the floor surface FL.

According to the autonomous mobile robot 100 according to the present embodiment, during removal of the battery 50 performed by the operator, the front wheel 57 passes through the opening part 66 of the stopper member 60 so that the operator can easily pull out the battery 50 to the near side, while the rear wheels 58 and 59 are temporarily stopped by the restrictors 65 of the stopper member 60. This makes it possible to prevent the battery 50 from dropping from the battery container 40, and for the operator to safely remove the battery 50 from the battery container 40 with grasping the front grip 53 and the rear grip 54. Therefore, it is possible to make the work of replacement of the battery easier.

Figure 11:
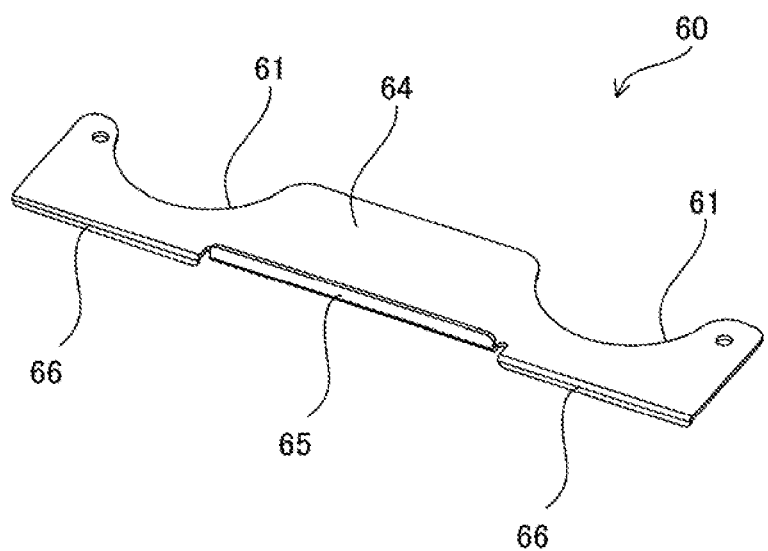
FIG. 11 is a perspective view illustrating another configuration of the stopper member in the autonomous mobile robot according to the embodiment of the present disclosure.

The present disclosure is not limited to the configuration described above. For example, the battery 50 (see FIGS. 3A to 3D) may have a configuration in which the front and rear sides are reversed. Specifically, the wheels 58 and 59 may be arranged on the removal port 40a side (near side) in the battery container 40, while the wheel 57 may be disposed on the far side in the battery container 40. In this case, as illustrated in FIG. 11, in the stopper member 60, a restrictor 65 is provided on the center, and opening parts 66 are provided on both sides of the restrictor 65. Thus, during removal of the battery 50, the front wheels 58 and 59 pass through the opening parts 66, and the rear wheel 57 is temporarily stopped by the restrictor 65. It is noted that, in a state where the battery 50 is contained in the battery container 40, the wheels 58 and 59 are received in cutout parts 61 on both sides. In this case, the wheels 58 and 59 are each an example of the first wheel of the present disclosure, and the wheel 57 is an example of the second wheel of the present disclosure. It is noted that, in the present disclosure, the number of first wheels and the number of second wheels are not limited.

It is noted that, in the present disclosure, within the scope of the invention described in claims, the embodiments described above may be freely combined, or the embodiments may be appropriately modified or some of the embodiments may be omitted.

It is to be understood that the embodiments herein are illustrative and not restrictive, since the scope of the disclosure is defined by the appended claims rather than by the description preceding them, and all changes that fall within metes and bounds of the claims, or equivalence of such metes and bounds thereof are therefore intended to be embraced by the claims.

What is claimed is:

1. A battery device comprising:
   a battery that supplies power to a driver; and
   a battery container device that contains the battery, wherein
   the battery container device includes:
   a battery container that removably contains the battery; and
   a stopper member provided at a removal port for the battery in the battery container,
   the stopper member includes an opening part that allows a first wheel provided on the removal port side in the battery to pass through the removal port during removal of the battery from the battery container, and a restrictor that restricts a second wheel provided on a side opposite to the removal port in the battery from passing through the removal port during removal of the battery from the battery container, and
   in the battery, the first wheel and the second wheel are offset from each other when the battery is viewed from a removal direction in which the battery is removed.

2. The battery device according to claim 1, wherein
   in the battery, the first wheel is provided on the removal port side, and two second wheels are provided on the side opposite to the removal port.

3. The battery device according to claim 1, wherein
   the battery includes a first grip that allows an operator to grasp on the removal port side, and a second grip that allows the operator to grasp on the side opposite to the removal port.

4. The battery device according to claim 3, wherein
   a space for the operator to grasp the second grip is formed between the battery and the battery container when the second wheel comes in contact with the restrictor.

5. The battery device according to claim 1, wherein
   the battery container further includes a receiver that receives the first wheel when the battery is contained in the battery container.

6. The battery device according to claim 1, wherein
   when the second wheel comes in contact with the restrictor during removal of the battery from the battery container, the first wheel is contactable with a floor surface.

7. A method of removing the battery from the battery container in the battery device according to claim 1, the method comprising:
   pulling the battery contained in the battery container toward the removal port side to pass the first wheel through the opening part of the stopper member;
   bringing the second wheel into contact with the restrictor of the stopper member after the first wheel passes through the opening part;
   bringing the first wheel into contact with a floor surface in a state where the second wheel is in contact with the restrictor; and
   in a state in which the first wheel is in contact with the floor surface, causing the second wheel to run over the restrictor and bringing the second wheel into contact with the floor surface.

8. The battery device according to claim 1, wherein
   the stopper member is fixed to a bottom plate of the battery container, and the restrictor is provided to rise upward from the bottom plate.

9. The battery device according to claim 1, wherein
   in the stopper member, the opening part is provided to overlap with a traveling path of the first wheel during removal of the battery from the battery container, and the restrictor is provided to overlap with a traveling path of the second wheel during removal of the battery from the battery container.

* * * * *